US012338682B2

(12) United States Patent
Zhang et al.

(10) Patent No.: US 12,338,682 B2
(45) Date of Patent: Jun. 24, 2025

(54) COMPOUND SPRING BAR

(71) Applicant: Mingyang Windeco Technology Corporation, Henan (CN)

(72) Inventors: Nianqing Zhang, Henan (CN); Shehua Wei, Henan (CN); Peilun Qian, Henan (CN)

(73) Assignee: Mingyang Windeco Technology Corporation, Zhenzhou (CN)

( * ) Notice: Subject to any disclaimer, the term of this patent is extended or adjusted under 35 U.S.C. 154(b) by 0 days.

(21) Appl. No.: 17/842,659

(22) Filed: Jun. 16, 2022

(65) Prior Publication Data

US 2023/0340833 A1 Oct. 26, 2023

(30) Foreign Application Priority Data

Apr. 22, 2022 (CN) ......................... 202210428976.3
Apr. 22, 2022 (CN) ......................... 202220943622.8

(51) Int. Cl.
*E06B 9/322* (2006.01)

(52) U.S. Cl.
CPC .................................... *E06B 9/322* (2013.01)

(58) Field of Classification Search
CPC ............. E06B 9/322; E06B 2009/2627; E06B 2009/3222; E06B 2009/3225; E06B 9/60
See application file for complete search history.

(56) References Cited

U.S. PATENT DOCUMENTS 571,972 A * 11/1896 Janney ...................... F16F 3/04 267/168
1,971,995 A * 8/1934 Stuber ...................... E06B 9/90 160/301
5,775,619 A * 7/1998 Tabellini ................... E06B 9/60 242/372
5,964,426 A * 10/1999 Tabellini ................... E06B 9/60 242/375
6,098,757 A * 8/2000 Stephenson ............... F03G 1/02 242/372
6,123,140 A * 9/2000 Bergamaschi ............ E06B 9/60 185/43
11,536,067 B2 * 12/2022 Daus ......................... E06B 9/60
2017/0058600 A1 * 3/2017 Mocanu ..................... E06B 9/44
2020/0284093 A1 * 9/2020 Dahlgren .................. E06B 9/62
2022/0090446 A1 * 3/2022 Lu ............................. E06B 9/80

* cited by examiner

*Primary Examiner* — Daniel P Cahn
*Assistant Examiner* — John W Hanes, Jr.
(74) *Attorney, Agent, or Firm* — HSML P.C.

(57) ABSTRACT

A compound spring bar includes a compound spring having one end fixed and the other end rotating as a curtain fabric opens and closes, where the compound spring includes at least two springs with different diameters, the springs are nested in layers according to their diameters, adjacent springs are connected in series, and all the springs form a combined spring; and free ends of an innermost spring and an outermost spring in the combined spring, which are not connected to other springs in series, are two ends of the combined spring.

3 Claims, 5 Drawing Sheets

COMPOUND SPRING BAR

FIELD OF TECHNOLOGY

The present invention relates to the curtain field, and in particular to a compound spring bar.

BACKGROUND

The non-pull (honeycomb) blinds currently on the market are designed with a constant force spring system. The non-pull roller blinds are mainly made with a torsion spring rod system. A cloth tube drives the spring to twist to generate a torsion force. The spring bar has a requirement for the length of the spring, and mismatches a curtain with a smaller width. The torsion force difference occurring between when the roller blinds are rolled up and when they are fully unfolded is large, and it is necessary to increase the counterweight to offset the force difference. When the curtain is pulled down quickly, the spring of a spring bar expands rapidly, but its structure cannot release the extension force quickly, which is likely to cause deformation and damage of the spring.

SUMMARY

The present invention provides a compound spring bar.

Compared with the related art, the compound spring bar of the present invention is of a multi-spring structure. A spring with a larger diameter is sleeved outside the one with a smaller diameter. Compared with the existing spring bar in the market, the length of the spring is shortened by half under the same effect. Therefore, the present invention saves a space, such that a curtain with a smaller width can be made, saving a material and reducing the manufacturing costs. Under the same torsion force, when the compound spring bar and the existing spring bar in the market rotate one more circle, the increment of torsion force on the compound spring bar is smaller, thereby solving the problem that a big force difference occurs between when a curtain is rolled up and when it is fully unfolded. During the torsion of the spring, the extension direction of the spring is at one end of the adapter. During the extension, the adapter slides along the support tube or the connecting rod, with a small frictional resistance. When the spring extends rapidly, due to the small resistance, the extension force can be released quickly, thereby protecting the spring and prolonging the service life of the spring bar.

1, fabric; 2, compound spring; 20, big spring; 21, small spring; 22, adapter; 23, big joint; 24, small joint; 3, support tube; 4, retractable tube; 5, connecting rod; 6, track; 7, lower beam; 8, upper track; 9, lower track; 10, slider; 11, micro-modulation head; and 12, tail.

DETAILED DESCRIPTION OF THE EMBODIMENTS

In the present invention, unless otherwise expressly specified and limited, the technical terms used in the present application shall have the usual meanings understood by those skilled in the present invention. Terms such as "interconnection", "connection", "fixed to", or "disposed" should be comprehended in a broad sense. For example, the connection may be a fixed connection, a detachable connection, or an integral connection; a direct connection or an indirect connection by using an intermediary; or a mechanical connection or an electrical connection. Unless otherwise expressly specified and limited, a case that a first feature is "above" or "below" a second feature may be that the first feature is in direct contact with the second feature or in indirect contact with it by using an intermediary. In addition, a case that the first feature is "above", "over" or "on" the second feature may be that the first feature is directly above or obliquely above the second feature or simply indicates that the first feature is horizontally higher the second feature. A case that the first feature is "under", "below" or "underneath" the second feature may be that the first feature is directly below or obliquely below the second feature or simply indicates that the first feature is horizontally lower the second feature. Relational terms such as first and second are used to only distinguish one entity or operation from another entity or operation without necessarily requiring or implying any actual such relationship or order between such entities or operations. Terms used in the description such as "center", "lateral", "longitudinal", "length", "width", "thickness", "height", "front", "back", "left", "right", "above", "below", "vertical", "horizontal", "top", "bottom", "inner", "outer", "axial", "radial", "circumferential", "clockwise", and "counterclockwise" indicate the orientation or position relationships based on the drawings. These terms are merely intended to facilitate description of the present invention and simplify the description, rather than to indicate or imply that the mentioned apparatus or element must have a specific orientation and must be constructed and operated in a specific orientation.

Figure 1:
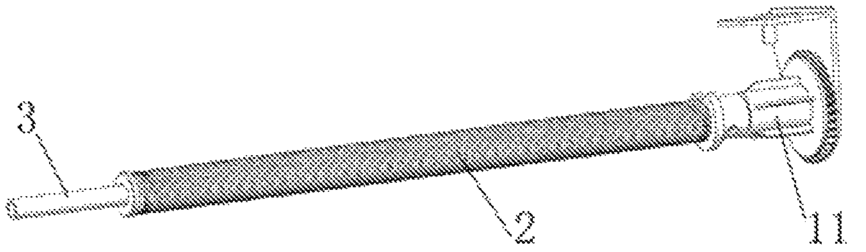
FIG. 1 is a schematic diagram according to Embodiment 1 of the present invention.
Figure 2:
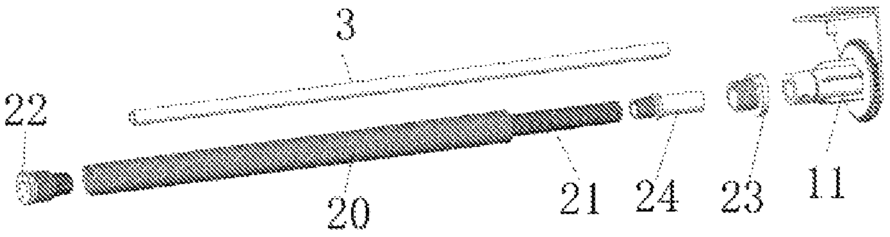
FIG. 2 is an exploded view of FIG. 1.
Figure 3:
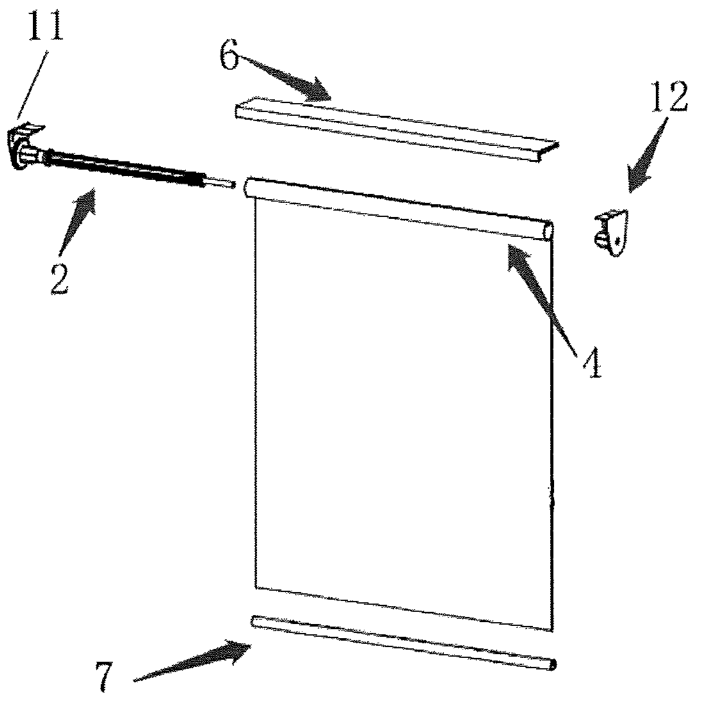
FIG. 3 is an exploded view of a non-pull curtain according to Embodiment 1.
Figure 4:
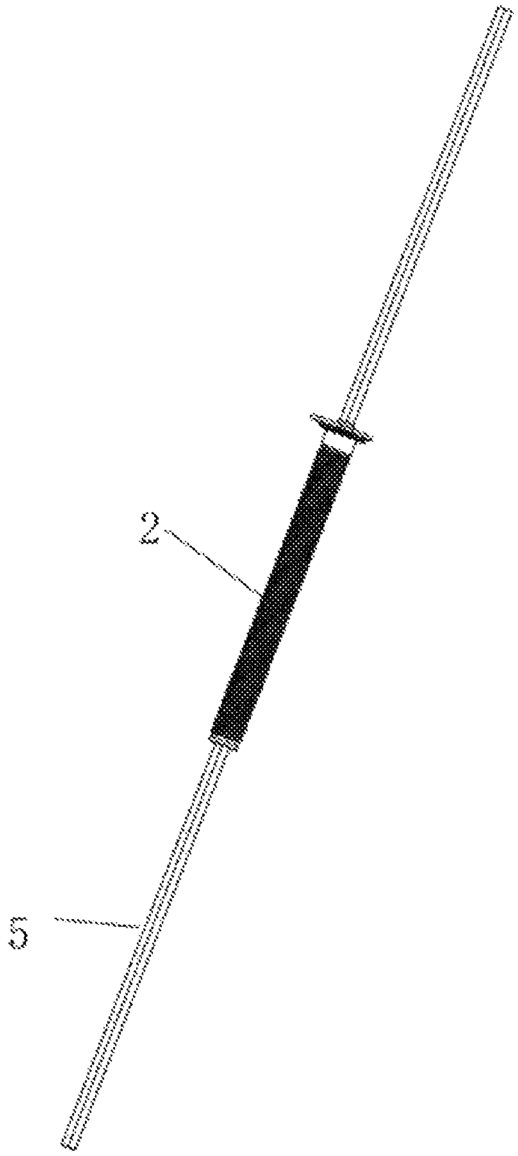
FIG. 4 is a schematic diagram according to Embodiment 2 of the present invention.
Figure 5:
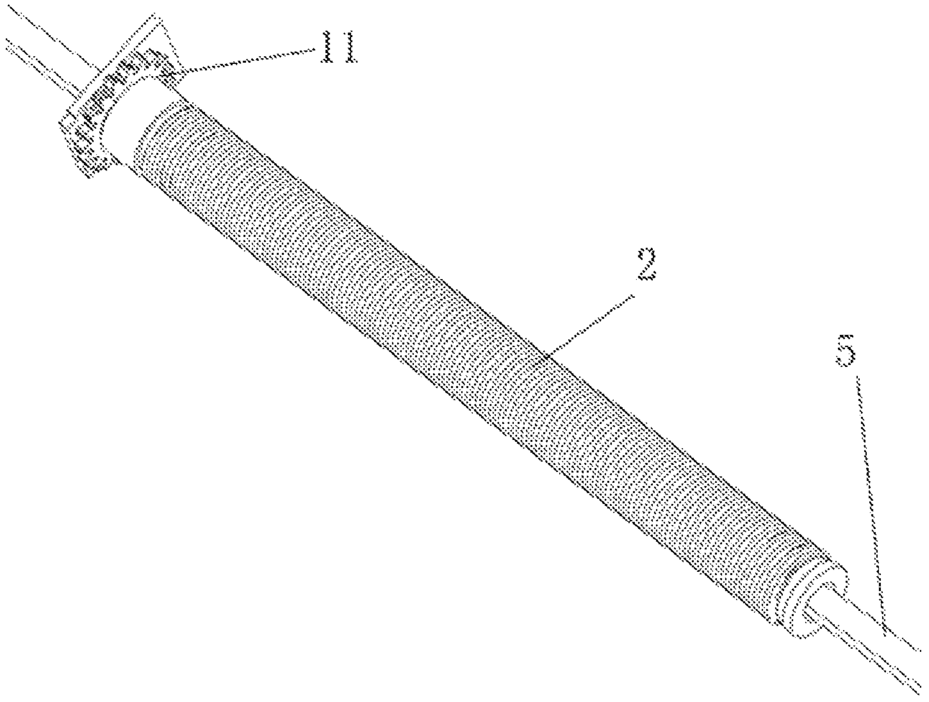
FIG. 5 is an enlarged view of a part of a compound spring in FIG. 4.
Figure 6:
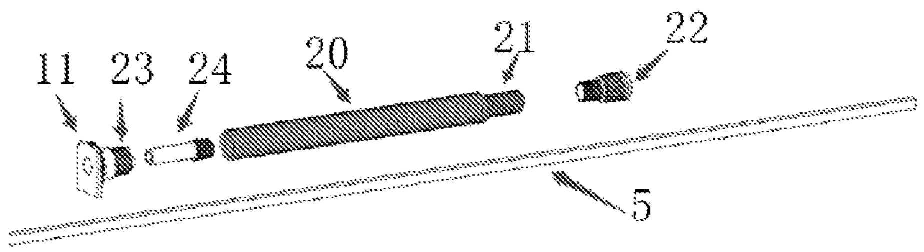
FIG. 6 is an exploded view of FIG. 5.
Figure 7:
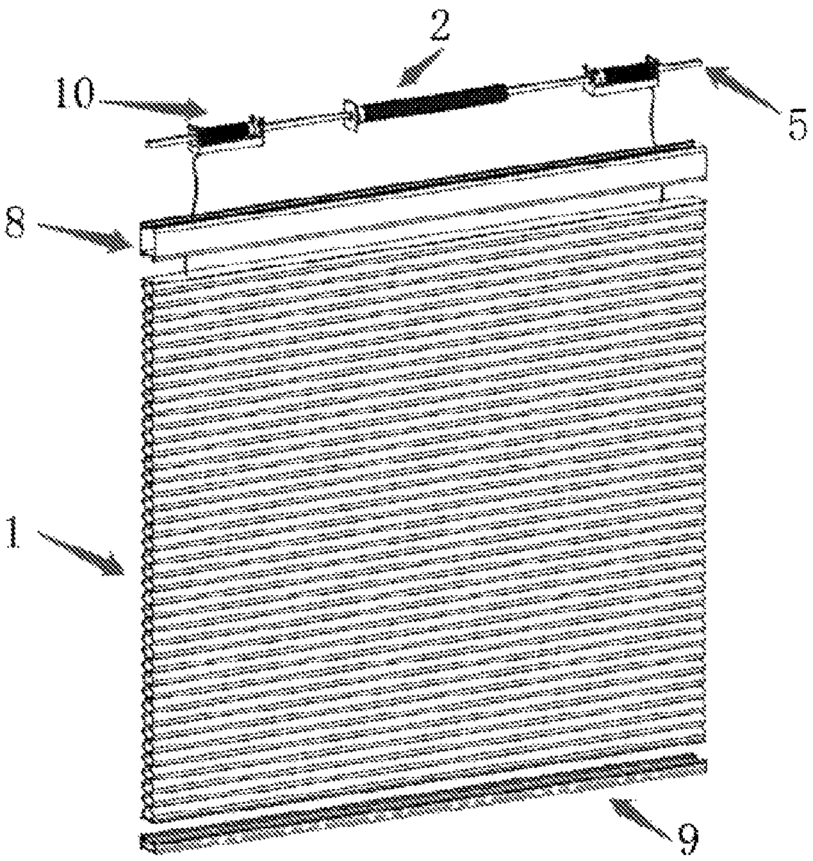
FIG. 7 is an exploded view of the non-pull curtain according to Embodiment 2, where

The technical solutions of the present invention are described clearly and completely below with reference to the accompanying drawings and specific embodiments. As shown in FIG. 1 to FIG. 7, a compound spring bar includes a compound spring 2 having one end fixed and the other end rotating as a curtain fabric opens and closes, where the compound spring 2 includes at least two springs with different diameters, the springs are nested in layers according to their diameters, adjacent springs are connected in series, and all the springs form a combined spring; and free ends, of an innermost spring and an outermost spring in the combined spring, not connected to other springs in series are two ends of the combined spring respectively. In a practical technical solution, according to different curtain structures, the innermost spring may be selected to rotate with the opening and closing of a curtain 1, and the remaining springs follow the rotation to store energy. Alternatively, the outermost spring may be selected to rotate with the opening and closing of the curtain 1. The compound spring 2 bar of the present invention is of a multi-spring structure. A spring with a larger diameter is sleeved outside the one with a smaller diameter. Compared with the existing spring bar in the market, the length of the spring is shortened by half under the same effect. Therefore, the present invention saves a space, such that a curtain with a smaller width can be made, saving a material and reducing the manufacturing costs. The present invention is also applied to non-pull blinds such as non-pull honeycomb blinds. In some technical solutions, the compound spring 2 bar further includes: a retractable tube 4 that is connected to an upper end of the curtain fabric 1 and is rotatable with opening and closing of the curtain, where the retractable tube 4 is sleeved on the outermost spring in the combined spring and is fixed to the free end of the outermost spring, a support tube 3 penetrates through the innermost spring in the combined spring, and the free end of the innermost spring in the combined spring is fixed.

Specifically, the compound spring 2 includes a big spring 20 and a small spring 21, and the small spring 21 is disposed in the big spring 20; two ends of the big spring 20 are fixed to a big joint 23 and an adapter 22 respectively; the big joint 23 is fixed to the retractable tube 4; the adapter 22 is rotatable and slidable on the support tube 3; the small spring 21 has one end fixed to the adapter 22 and the other end fixedly connected to a small joint 24; and the small joint 24 is fixed to a head, a tail 12, or a track 6 of the curtain, or a wall. In a specific embodiment, the small joint 24 is preferably fixedly connected to a micro-modulation head 11, and the large joint 23 is sleeved outside the small joint 24 and can rotate freely. The micro-modulation head 11 can fine modulate the torque of the small spring 21. The two ends of the support tube 3 are respectively fixed to the head and the tail 12 and do not rotate.

Description is made by using a non-pull curtain as an example. The non-pull curtain includes the compound spring 2 rod. The support tube 3 in the compound spring 2 rod has one end fixed to the micro-modulation head 11 and the other end fixed to the tail 12. The compound spring 2 rod penetrates through the retractable tube 4. The micro-modulation head 11 and the tail 12 are fixed at two ends of the track 6. A lower beam 7 is disposed at the lower end of the curtain fabric 1.

In a specific embodiment, when the curtain opens and closes, the retractable tube 4 rotates to drive the large joint 23 fixed thereto to rotate counterclockwise, and the large joint 23 drives the large spring 20 to generate a torsion force. The torsion force is transmitted to the small spring 21 by using the adapter to form an accumulating force. The compound spring 2 needs to extend its length due to the torsion force. Because the small joint 24 and the support tube 3 are fixed to the micro-modulation head 11, and the large joint 23 is positioned between the small joint 24 and the micro-modulation head 11, the compound spring can be rotated flexibly while avoiding lateral movement. The compound spring 2 extends laterally only toward the adapter, and the adapter slides laterally along the support tube 3. An accumulating force is formed through anticlockwise rotation; the accumulating force is released through clockwise rotation.

In another technical solution, a connecting rod 5 rotating as the curtain opens and closes penetrates through the innermost spring in the combined spring, the free end of the innermost spring in the combined spring is fixed to the connecting rod 5, and the free end of the outermost spring in the combined spring is fixed. In this solution, the rotation of the connecting rod 5 drives the innermost spring to twist, and through the series structure, drives other springs to twist.

Specifically, the compound spring 2 includes a big spring 20 and a small spring 21, and the small spring 21 is disposed in the big spring 20; two ends of the big spring 20 are fixed to a big joint 23 and an adapter 22 respectively; the big joint 23 is fixed to a head, a tail 12, or a track 6 of the curtain, or a wall, and the adapter 22 is rotatable and slidable on the connecting rod 5; and the small spring 21 has one end fixed to the adapter 22 and the other end fixed to the connecting rod 5 by using the small joint 24. The large joint 23 can be connected to the micro-modulation head 11 to fine modulate the elastic force of the compound spring 2. The micro-modulation head 11 is made by using the related art. The shape of the connecting rod 5 may be square. The square connecting hole penetrates through the hole in the micro-modulation head and rotates freely.

Description is made by using non-pull honeycomb blinds as an example. The non-pull curtain includes a fabric 1, an upper track 8, and a lower track 9. A compound spring 2 is disposed in the middle of the connecting rod 5, and sliders 10 are disposed at two ends of the connecting rod 5. A pulling string on the curtain fabric 1 is wound on a slider 10 rod, and the slider 10 rod drives the connecting rod 5 to rotate. The connecting rod 5 is disposed in the upper track 8, and the lower track 9 is connected to the lower end of the curtain 1. The slider 10 and the retractable structure of the curtain belong to the related art and are not described in detail.

In a specific embodiment, when the curtain opens and closes, the connecting rod 5 drives the small joint 24 to drive anticlockwise. The small joint 24 drives the small spring 21 to generate a torsion force. The torsion force is transmitted to the large spring 20 by using the adapter to form an accumulating force. The compound spring 2 needs to extend its length due to the torsion force. Because the large joint 23 is fixed to the micro-modulation head 11, and the small joint 24 can rotate flexibly, the lateral movement is avoided. The compound spring 2 extends laterally only toward the adapter, and the adapter slides laterally along the square connecting rod 5.

In addition, the adapter 22 includes a big cylinder and a small cylinder that are concentrically disposed, and outer surfaces of the big cylinder and the small cylinder are respectively provided with helical grooves accommodating the big spring 20 and the small spring 21; and the big joint 23 and the small joint 24 are also provided with helical grooves respectively corresponding to the big spring 20 and the small spring 21. The large joint 23 and the small joint 24 are made by using the related art. The adapter 22 may be fixed to the large spring 20 and the small spring 21 simultaneously by using an existing method.

Under the same torsion force, when the compound spring 2 bar of the present invention and the existing spring bar in the market rotate one more circle, the increment of torsion force on the compound spring 2 bar is smaller, thereby solving the problem that a big force difference occurs between when a curtain is rolled up and when it is fully unfolded. During the torsion of the spring, the extension direction of the spring is at one end of the adapter 22. During the extension, the adapter 22 slides along the support tube 3 or the connecting rod 5, with a small frictional resistance. When the spring extends rapidly, due to the small resistance, the extension force can be released quickly, thereby protecting the spring and prolonging the service life of the spring bar.

The technical characteristics of the foregoing embodiments can be employed in arbitrary combinations. However, these combinations of technical characteristics should be construed as disclosed in the description as long as no contradiction occurs. Without departing from the overall concept of the present invention, equivalent replacements or changes, and some changes and improvements made according to the technical solutions of the present invention shall fall within the protection scope of the present invention.

The invention claimed is:

1. A compound spring bar, comprising:

a compound spring, the compound spring comprising:

at least two springs including a first spring having a first end and a second end, and a second spring having a first end and the second end, the first spring having a first diameter and the second spring having a second diameter, the first diameter being greater than the second diameter, wherein the first and second springs are nested in layers with the second spring nested within the first spring according to their diameters, the first and second springs are connected in series;

a first end of the first spring constituting a first end of the compound spring, and a second end of the first spring is fixed to an adapter; and a first end of the second spring is fixed to the adapter, and a second end of the second spring constituting a second end of the compound spring; and a retractable tube that is connected to an upper end of curtain fabric and is rotatable with opening and closing of a curtain including the curtain fabric, wherein the retractable tube is fixed to one of the first and second ends of the compound spring, a support tube penetrates through the second spring in the compound spring, an other one of the first and second ends of the compound spring is fixed, wherein when the compound spring is connected to the curtain fabric to open and close the curtain, the one of the first and second ends of the compound spring is rotatable and the other one of the first and second ends of the compound spring is fixed to a head, a tail, a track of the curtain, or a wall and wherein the adapter is configured to rotate freely and slide freely on and along the support tube, corresponding to opening and closing of the curtain.

2. The compound spring bar according to claim 1, wherein the adapter comprises a big cylinder and a small cylinder that are concentrically disposed, and outer surfaces of the big cylinder and the small cylinder are respectively provided with helical grooves accommodating the first spring and the second spring; and a big joint and a small joint are also provided with helical grooves respectively corresponding to the first spring and the second spring.

3. A compound spring bar, comprising:

a compound spring, the compound spring comprising:

at least two springs including a first spring having a first end and a second end, and a second spring having a first end and a second end, the first spring having a first diameter and the second spring having a second diameter, the first diameter being greater than the second diameter, wherein the first and second springs are nested in layers with the second spring nested within the first spring according to their diameters, the first and second springs are connected in series;

a first end of the first spring constituting a first end of the compound spring;

a second end of the second spring constituting a second end of the compound spring, and a retractable tube that is connected to an upper end of curtain fabric and is rotatable with opening and closing of a curtain including the curtain fabric, wherein the retractable tube is fixed to the first end of the compound spring; and a connecting rod that rotates with opening and closing of the curtain, the connecting rod is configured to penetrate through the second spring of the compound spring and is fixed to the second end of the compound spring, wherein the first end of the compound spring is fixed to a big joint, and the second end of the first spring is fixed to an adapter; the big joint is fixed to a head, a tail, a retractable tube or a track of the curtain, wherein the first end of the second spring is fixed to the adapter, and wherein the adapter is configured to rotate freely and slide freely on and along the connecting rod, corresponding to opening and closing of the curtain.

* * * * *